United States Patent [19]
Petersen et al.

[11] Patent Number: 5,579,858
[45] Date of Patent: Dec. 3, 1996

[54] AUTOMOTIVE AIR INTAKE ASSEMBLY

[75] Inventors: James R. Petersen, Grosse Ile, Mich.;
Darin W. Battles, Hannibal, Mo.;
Raymond T. Champagne, Taylor, Mich.

[73] Assignee: Ford Motor Company, Dearborn, Mich.

[21] Appl. No.: 332,196

[22] Filed: Oct. 31, 1994

[51] Int. Cl.$^6$ .................................................. B60K 13/02
[52] U.S. Cl. ................................ 180/68.3; 55/DIG. 28; 277/227
[58] Field of Search ..................................... 277/166, 189, 277/227; 55/385.3, DIG. 28; 180/68.1, 68.2, 68.3

[56] References Cited

U.S. PATENT DOCUMENTS

| | | | |
|---|---|---|---|
| 2,881,860 | 4/1959 | Ternes | 180/68.3 X |
| 2,952,327 | 9/1960 | Farr | 180/68.3 |
| 3,249,172 | 5/1963 | DeLorean | 180/68.3 |
| 3,481,117 | 5/1968 | McKinlay | 55/385 |
| 3,641,746 | 2/1972 | Smith et al. | 55/385 |
| 4,831,981 | 5/1989 | Kitano | 180/68.3 |
| 4,865,335 | 9/1989 | McGann | 277/229 X |
| 5,022,479 | 6/1991 | Kiser et al. | 180/68.3 |
| 5,183,271 | 2/1993 | Wada et al. | 277/227 X |
| 5,199,522 | 4/1993 | Martenas et al. | 180/68.3 |

*Primary Examiner*—Eric D. Culbreth
*Assistant Examiner*—Michael Mar
*Attorney, Agent, or Firm*—Damian Porcari

[57] ABSTRACT

An automotive air intake assembly having a conduit is integrally molded to a rigid plastic striker plate without the need of additional fasteners or adhesives. The striker plate has an annular planar portion and a beveled portion surrounding the planar portion. The planar portion has first and second surfaces and a plurality of apertures therethrough. The first surface mates with an air cleaner. Members on the second surface bisect the apertures and form an attaching surface. An elastomeric conduit is integrally molded about the attaching surface to permanently fasten the conduit to the striker plate.

2 Claims, 4 Drawing Sheets

AUTOMOTIVE AIR INTAKE ASSEMBLY

RELATED APPLICATION

This invention is related to "AUTOMOTIVE AIR INTAKE SYSTEM" attorney docket no. 93-710-2, Ser. No. 08/332,232, filed on the same date as the present application, now U.S. Pat. No. 5,558,176, and incorporated herein by reference.

BACKGROUND OF THE INVENTION

1. Field of the Invention

The invention provides for an automotive air intake system having a shear closing movement. More particularly, the invention relates to an automotive air intake system having an integrally molded striker plate and elastomeric conduit.

2. Description of the Related Art

Automotive vehicles, in particular heavy duty trucks, feature a forward tilting, pivotally mounted hood to provide access to the engine compartment. A useful feature for forward tilting hoods is a side mounted fresh air inlet for the air cleaner. Side mounted inlets are generally exposed to cleaner air than front facing or bottom facing air inlets.

Heretofore, it has been difficult to seal the interface between the pivotally moving hood and the stationary air cleaner inlet. Flexible boots have been attached to the air cleaner inlet to seal against the interior surface of the hood. As the hood closes, the boot is partially deflected by the hood air inlet. With age and use, the boot may become deformed and have gaps around its perimeter, Under-hood air may enter the air intake system through the gaps and reduce the efficiency of the engine.

The prior art collapsible designs have not provided the desired durability and sealing properties when used with hoods having a shear closing movement. The elastomeric rubbers used for the flexible boot abrade against the hard interior hood surface. The resiliency of the rubber and the closing forces do not uniformly compress the boot. Hence its sealing properties change with temperature. Vibration causes a relative movement between the hood and air cleaner. Boots do not provide sufficient elongation and compression to maintain a seal between the hood and air cleaner when the vehicle experiences heavy vibrations.

The present invention is designed to provide a long-life sealing interface for hoods having a shear closing movement. A rigid plastic interface between the air cleaner and hood withstands repeated closures and a flexible elastomeric conduit provides resilient biasing and longer travel to maintain a seal during rough road operation. The conduit is integrally molded to a rigid plastic striker plate without the need of additional fasteners or adhesives.

SUMMARY OF THE INVENTION

The present invention relates to an automotive air intake assembly comprising a rigid striker plate having an annular planar portion and a beveled portion surrounding the planar portion. The planar portion has first and second surfaces and a plurality of apertures therethrough. The first surface mates with an air cleaner. Members on the second surface bisect the apertures and form an attaching surface. An elastomeric conduit is integrally molded about the attaching surface to permanently fasten the conduit to the striker plate.

The apertures may be arranged annularly around the planar surface of the striker plate. When so arranged, the members form a continuous ring bisecting the apertures. Two or more concentric rows of apertures provide additional retention for large diameter air inlets. U-shaped members on the conduit mate with the apertures and encircle the concentric rings through the apertures. The invention provides for a low-cost attaching mechanism that does not use add-on fasteners or adhesives between the conduit and striker plate.

DETAILED DESCRIPTION OF THE PREFERRED EMBODIMENTS

Figure 1:
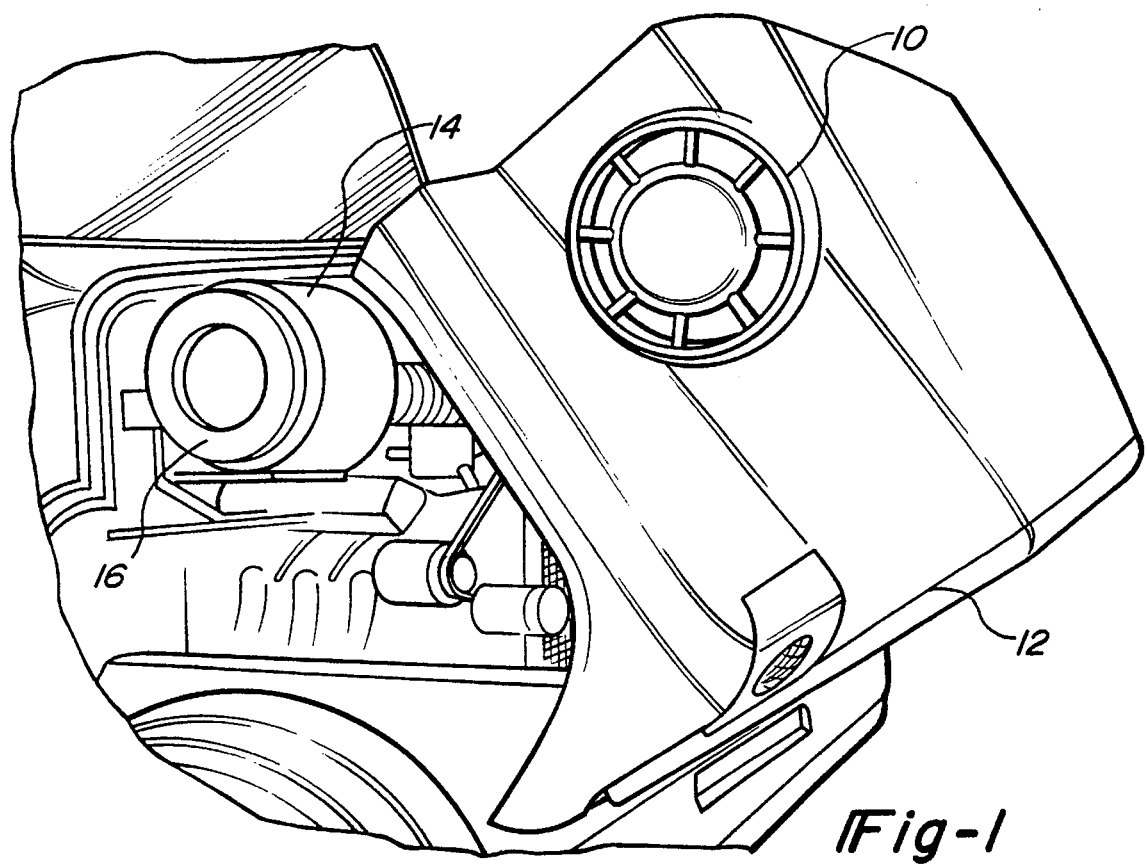
FIG. 1 illustrates a vehicle having a pivotal hood with a sheer closing movement in the open position.

Illustrated in FIG. 1, is a perspective view of a vehicle having a side-mounted fresh air inlet 10. Ambient air enters inlet 10 and passes through the generally vertical portion of hood 12. Hood 12 is hinged to provide a pivotal closing movement. Vertically mounted air inlet 10 mates with air cleaner 14 when the hood is moved to a closed position. Air cleaner plate 16 provides a planar sealing surface for air cleaner 14. Located within air cleaner 14 is a pleated air filter (not shown) as is well known in the art.

Figure 2:
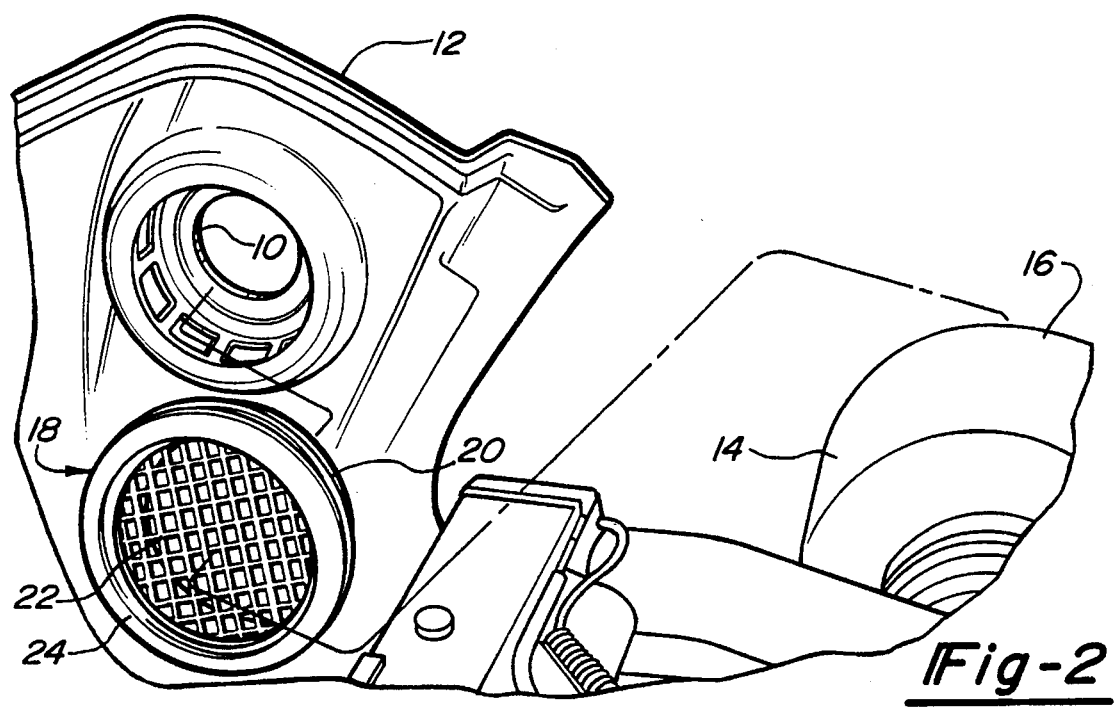
FIG. 2 is a partially exploded view of the interior portion of the vehicle shown in FIG. 1.

Illustrated in FIG. 2 is the interior surface of hood 12. Air inlet 10 receives striker assembly 18. Striker assembly 18 comprises a pleated bellows 20, screen 22, and striker plate 24. Bellows 20 provides a conduit between air intake 10 and striker plate 24. As will be more fully discussed below, bellows 20 is integrally molded to striker plate 24.

Striker plate 24 strikes air cleaner plate 16 and compresses bellows 20 when hood 12 is moved to a partially closed position. Striker assembly 18 mates with air cleaner plate 16 and provides for the flow of air through to air cleaner 14.

Figure 3:
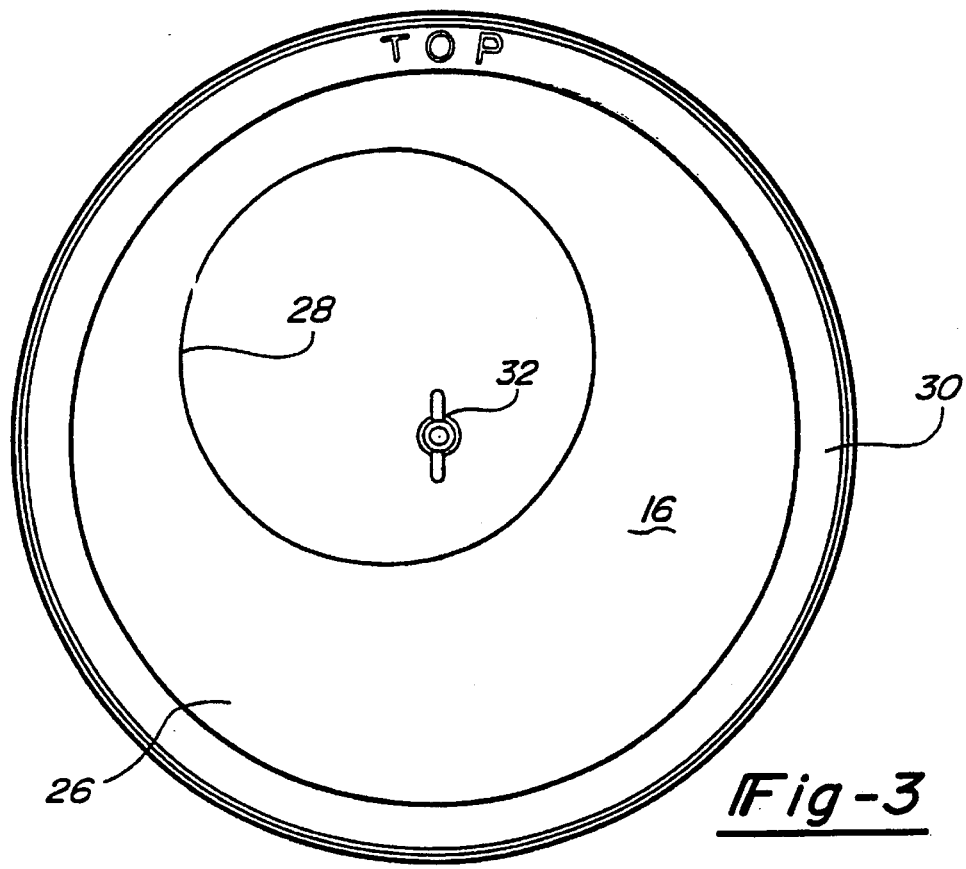
FIG. 3 is a plan view of an air cleaner plate.

Illustrated in FIG. 3 is a plan view of air cleaner plate 16. Air cleaner plate 16 has a planar sealing surface 26 and an air cleaner opening 28. Opening 28 is sized to be greater than or equal to the air filter area (not shown) within the air cleaner. A rounded edge 30 receives the striking force from striker plate 24. Air cleaner plate 16 may be made from a metal or plastic material. Particularly preferred are plastic materials including nylon 6 which is capable of withstanding the striking forces from repeated closures. Wing nut 32 secures air cleaner plate 16 to air cleaner 14.

Figure 4:
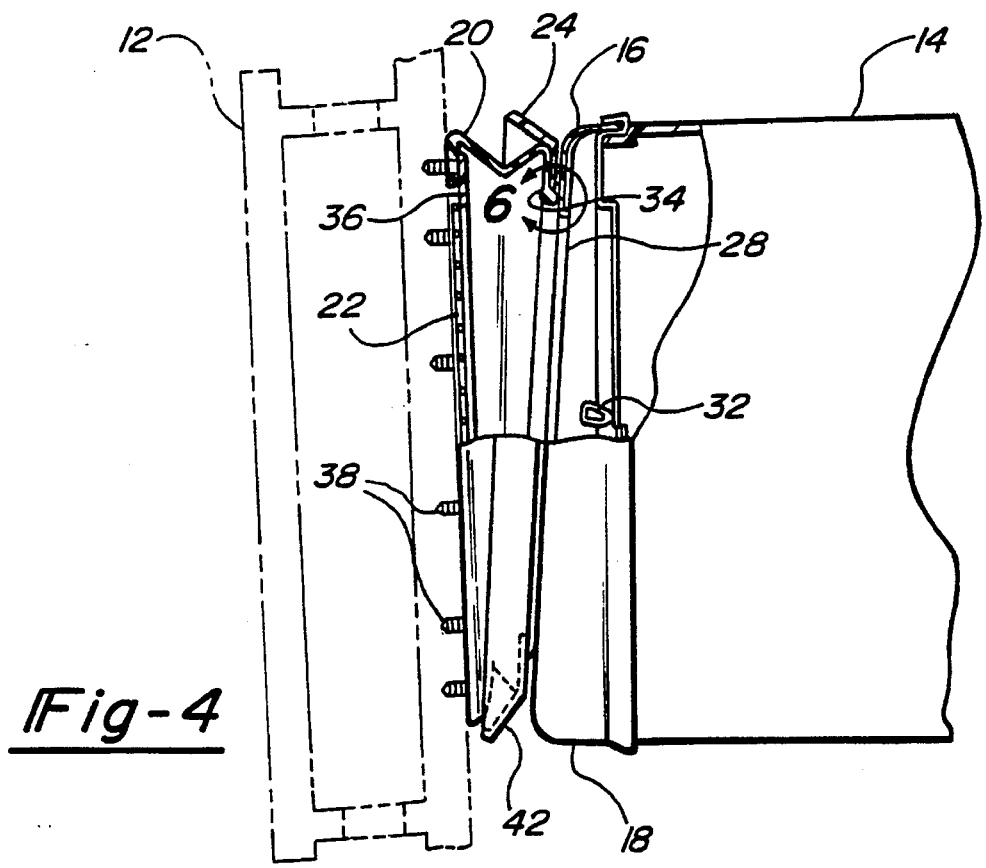
FIG. 4 is a side view partially broken away, of an air cleaner system with the hood in the closed position.
Figure 5:
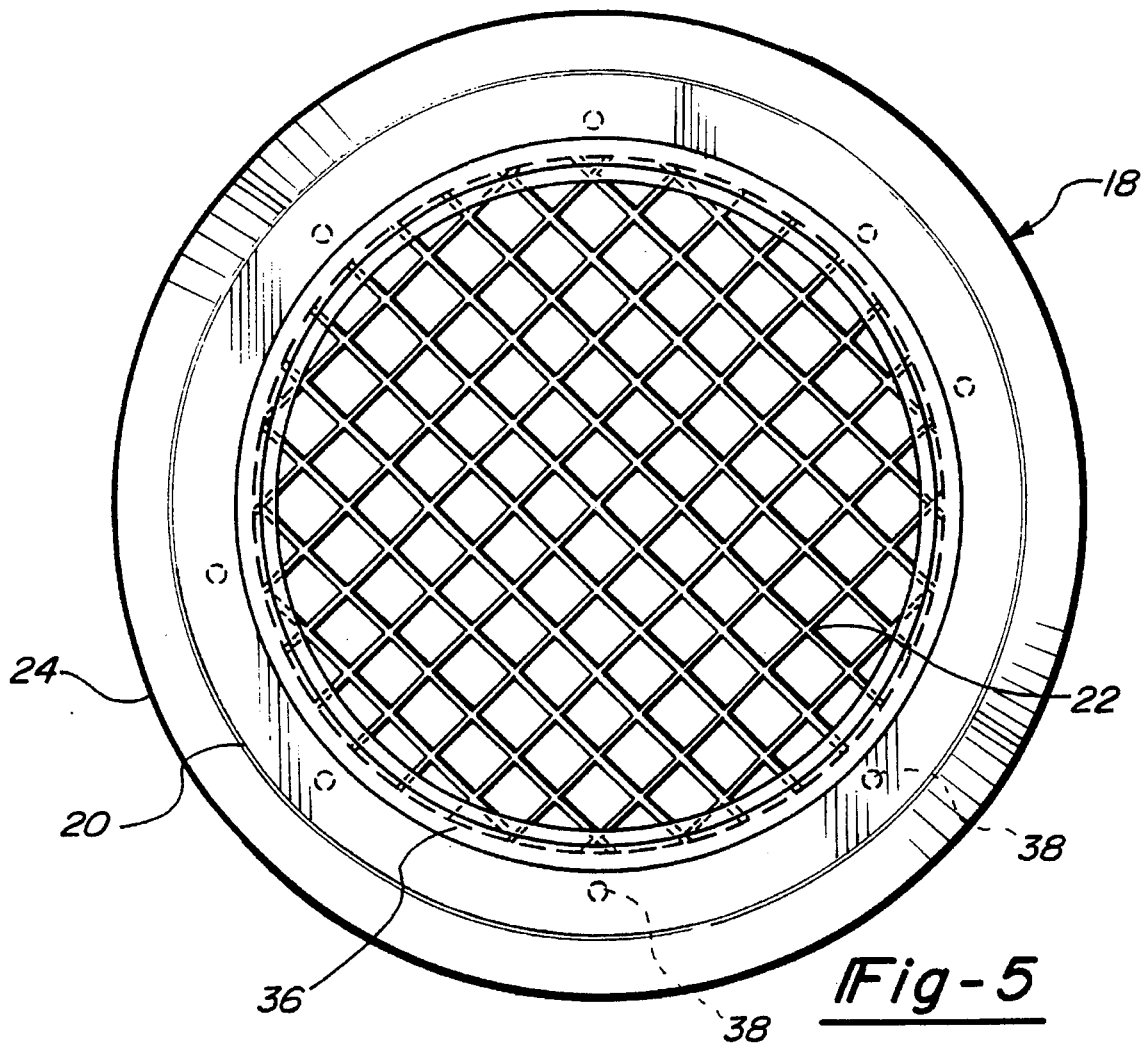
FIG. 5 is an interior plan view of the striker assembly.

FIGS. 4–5 illustrate striker assembly 18 mating with air cleaner 14 when the hood is moved to a totally closed position. Air cleaner plate 16 is angled to illustrate a hood closure having a combination shear and compression closing movement. A shear closing movement as used herein occurs when two planar surfaces are brought together in parallel planes. If one surface is stationary, then the other surface moves within a single plane to overly the stationary surface. This illustrates a system having a 100 percent shear closing movement. A compression closure movement as used herein occurs when planar surfaces are brought together perpendicular to one another. If one surface is stationary, then the other surface moves through multiple planes while always remaining parallel to the stationary surface. This illustrates a 100 percent compression closure movement. Automotive closure systems generally comprise a combination shear and compression closure movement. The closure movement illustrated in FIG. 4 is generally vertical with mostly shear closing movement.

Annular seal 34, about one end of bellows 20, provides a sealing interface between air cleaner plate 16 and bellows 20. Annular seal 34 lies concentric within striker plate 24. Seal 34 and the pleated cross-section of bellows 20 provide resilient biasing between hood 12 and air cleaner plate 16. Seal 34 continuously engages the planar sealing surface of air cleaner plate 16 in normal vehicle operation. Relative movement between hood 12 and air cleaner plate 16 is absorbed within bellows 20. A small amount of lateral movement between striker assembly 18 and air cleaner plate 16 is permitted while maintaining a near air-tight seal.

Screen 22 is secured within bellows 20 to prevent large debris from entering air cleaner opening 28. A metal lip 36, around screen 22 provides an attaching surface for fastening striker assembly 18 to hood 12 by means of barbed fasteners 38.

Figure 6:
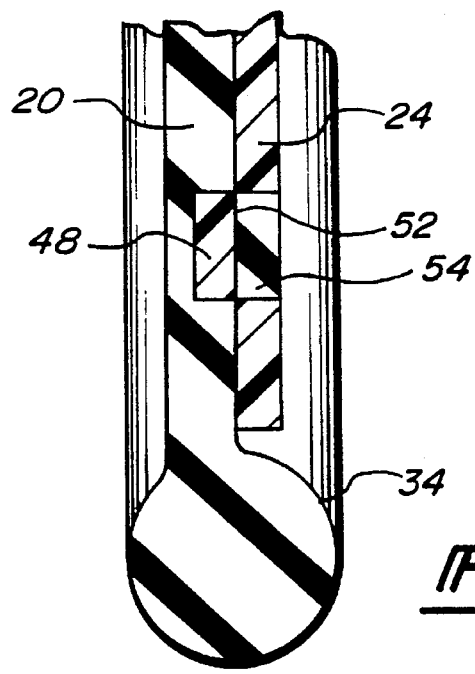
FIG. 6 is an enlarged view of the area marked 6 in FIG. 4.
Figure 7:
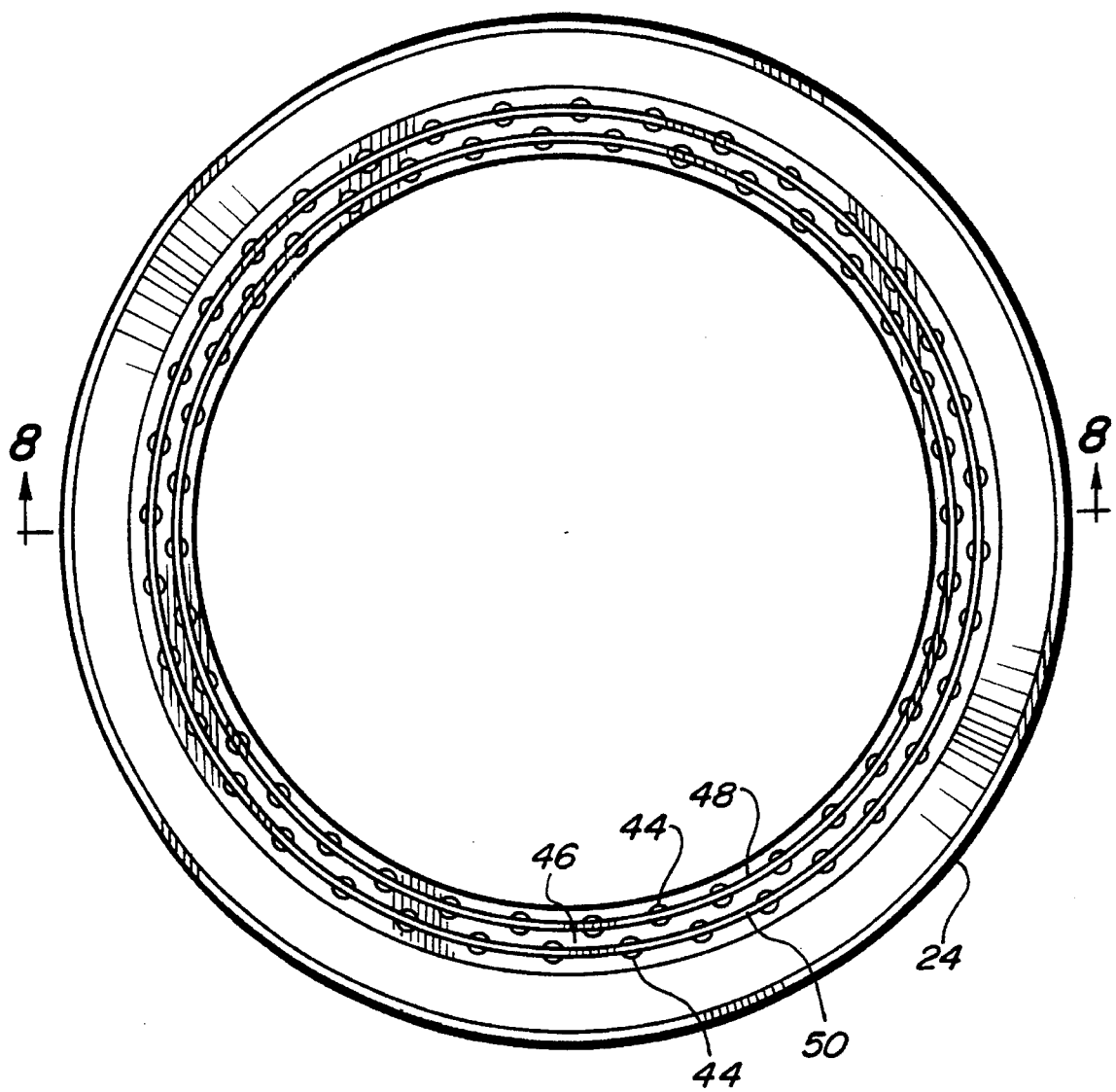
FIG. 7 is a plan view of the interior surface of the striker plate.
Figure 8:
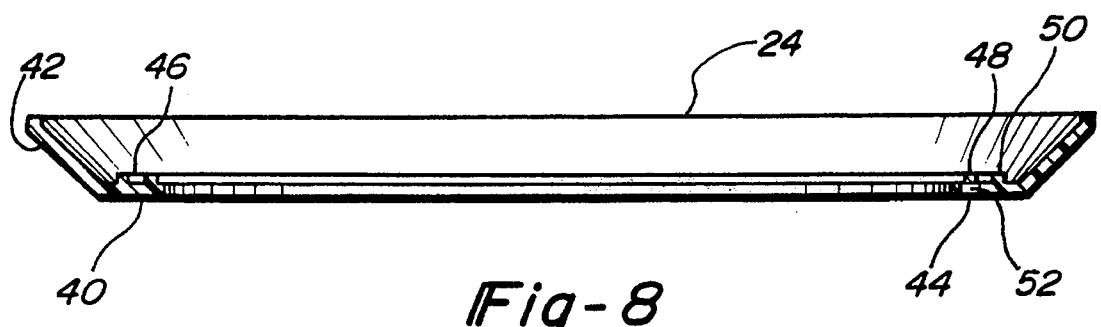
FIG. 8 is a sectional view of the striker plate shown in FIG. 7 taken along the line 8—8.

Bellows 20 is integrally molded with striker plate 24 in a process called insert molding. Striker plate 24 and bellows 20 are shown in FIGS. 6, 7 and 8. Striker plate 24 is injection molded in the form of an annular ring made from a nylon 6 material. Striker plate 24 has a planar surface 40 and a bevelled surface 42. Beveled surface 42 strikes the round edge of the air cleaner plate when the hood is moved to a partially closed position. Apertures 44 are arranged in two concentric rows around planar surface 40. Inner surface 46 includes two concentric rings 48, 50 that overly and bisect apertures 44. As used herein, bisect means that rings 48, 50 overly apertures 44 in a manner that a portion of the aperture is visible on either side of rings 48, 50. Attaching surface 52 on rings 48, 50 provide a mechanical attachment surface for bellows 20.

Striker plate 24 is placed within a molding apparatus and an elastomeric material such as EDPM rubber is injected within the apparatus to form bellows 20. The EDPM rubber has a durometer rating of approximately 60. EDPM rubber and other types of elastic materials do not adhere to the striker material. Therefore, the invention provides for a mechanical interlock between bellows 20 and striker plate 24. Projections 54 are formed within apertures 44. The projections have a U-shaped cross-section. The projections encircle a portion of rings 48, 50 that bisect apertures 44. Projections 54 generally do not extend beyond planar surface 40. Projections 54 permanently secure bellows 20 to attaching surface 52. During the molding process, the pleated portions of bellows 20 and annular seal 34 are simultaneously and integrally formed.

3. Method of Operation

The present invention is intended to be adaptable for use with existing vehicles. The assembly and method of operation are illustrated in FIG. 1–4. Striker assembly 18 attaches to the interior surface of hood 12 using existing mounting holes. Air cleaner plate 16 fastens to air cleaner 14 using wing nut fastener 32. When the hood moves from an open position to a partially closed position, beveled surface 42 strikes edge 30 and causes bellows 20 to compress. Striker plate 24 aligns generally parallel with air cleaner plate 16. The hard plastic surfaces of beveled surface 42, planar surface 40, edge 30, and planar sealing surface 26 withstand the repeated opening and closings of hood 12. When the hood is moved to a totally closed position, annular seal 34 contacts sealing surface 36 and forms a sealing surface. Vibrations, shake or movement of hood 12 with respect to air cleaner 14 are absorbed through the compression and elongation of bellows 20. Bellows 20 resiliently biases striker plate 24 in mating engagement with planar sealing surface 26.

The present invention has been illustrated using a hood having a large shear closing movement. The invention is useful for closures having a total shear, partial shear, or slight shear closing movement. The invention provides an all weather, long-lasting and reliable sealing systems for hoods having a sheer closure movement. Other advantages are inherent in the preferred embodiment described above.

The foregoing description illustrates the preferred embodiment of the invention. Modifications, changes and alterations of the present invention are possible without departing from the spirit and scope of the following claims.

What is claimed:

1. An automotive air intake assembly comprising:

a rigid striker plate having an annular planar portion with a central opening for the flow of air therethrough and a beveled portion surrounding said planar portion, said planar portion having first and second opposed surfaces and a plurality of apertures therethrough, said apertures being arranged around a perimeter of said planar portion;

ring shaped members on said second surface bisecting said apertures and forming a continuous attaching surface; and an elastomeric conduit integrally molded about said attaching surface and having a plurality of U-shaped projections mating with said apertures and encircling said ring shaped members through said apertures to permanently fasten said elastomeric conduit to said striker plate, said elastomeric conduit and said first surface forming an annular seal for mating with an air cleaner.

2. The automotive air intake assembly of claim 1, wherein said apertures are arranged in two or more concentric rows around said planar portion and said ring shaped members form two or more concentric rings bisecting said apertures.

* * * * *